United States Patent [19]

Takizawa et al.

[11] 4,372,578
[45] Feb. 8, 1983

[54] PASSIVE SAFETY BELT DEVICE

[75] Inventors: Junichi Takizawa, Isesaki; Seiichiro Kojima, Ohramachi; Nobuo Satoh; Eiji Nakazato, both of Ohta, all of Japan

[73] Assignee: Fuji Jukogyo Kabushiki Kaisha, Tokyo, Japan

[21] Appl. No.: 158,179

[22] Filed: Jun. 10, 1980

[30] Foreign Application Priority Data

Jul. 17, 1979 [JP] Japan .......................... 54-98657[U]

[51] Int. Cl.³ .............................................. B60R 21/10
[52] U.S. Cl. ...................................................... 280/802
[58] Field of Search ............... 280/802, 803, 804, 808; 297/469

[56] References Cited

U.S. PATENT DOCUMENTS 4,004,829 1/1977 Kato ................................... 280/802

FOREIGN PATENT DOCUMENTS 1509920 5/1978 United Kingdom ............... 280/803

Primary Examiner—Robert R. Song
Attorney, Agent, or Firm—Martin A. Farber

[57] ABSTRACT

A passive safety belt device for a vehicle having sash-less doors and a pair of seats, comprising a retractor provided on the floor of the vehicle between the seats, a belt supporting member upwardly extending from a rear portion of the sash-less door, and a safety belt connected between the retractor and the belt supporting member. The outer end portion of the safety belt is hardened in a predetermined range by a spring steel plate enclosed by the safety belt at an outer end portion of the latter and secured to the belt supporting member at an end thereof, the belt supporting member being a hollow body comprising a superimposed pair of plates, bolts securing the hollow body to an inside panel of the door, and the spring steel plate and the superimposed pair of plates being secured with each other so as to maintain the end portion in an upright position.

9 Claims, 3 Drawing Figures

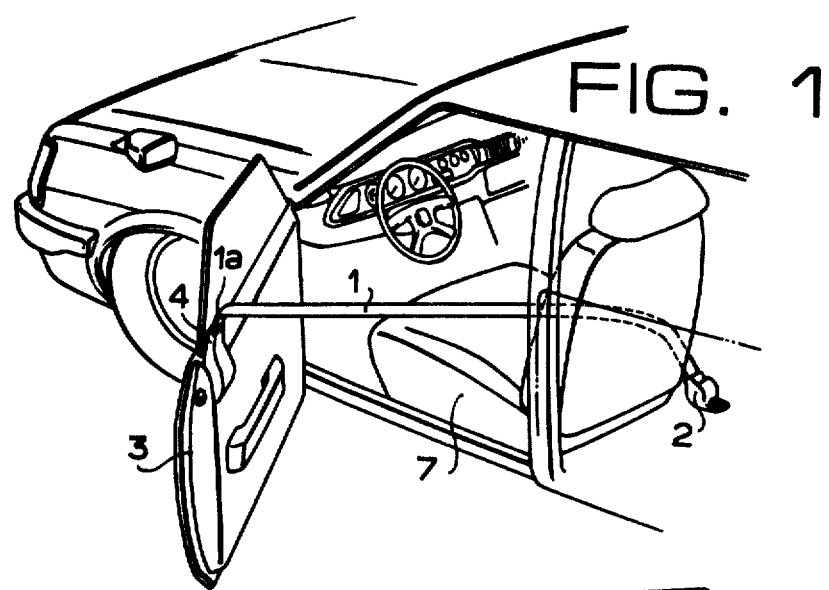
FIG. 1
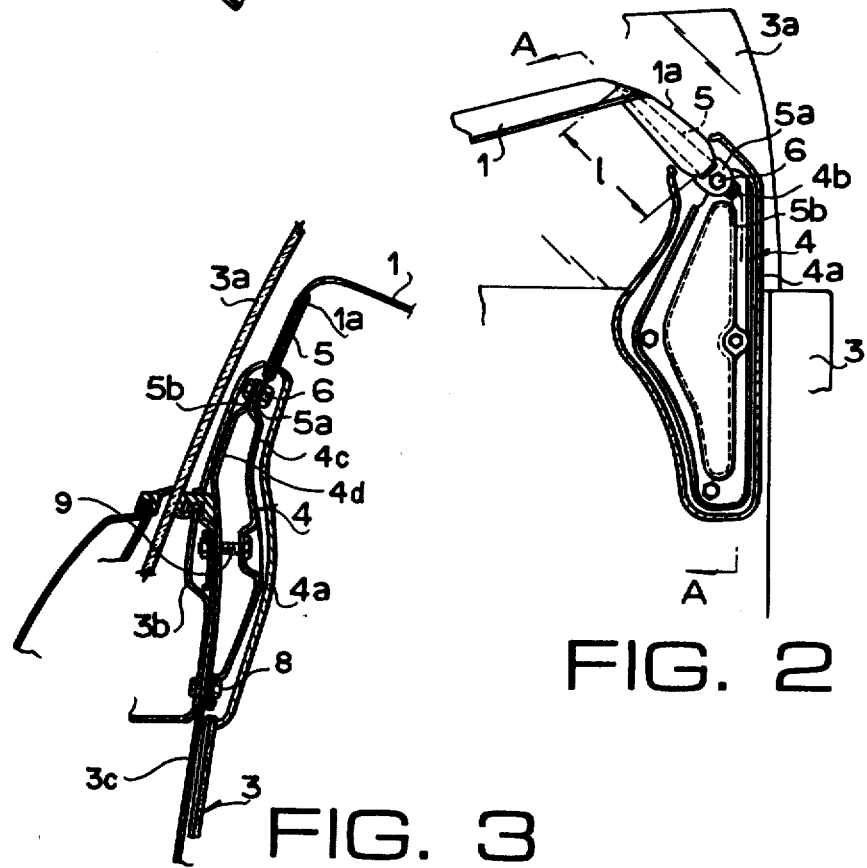
FIG. 2
FIG. 3

PASSIVE SAFETY BELT DEVICE

BACKGROUND OF THE INVENTION

The present invention relates to a passive safety belt device for a vehicle, such as an automobile.

A passive safety belt device has been provided in which a safety belt is connected between a rear portion of the door and a retractor provided on a body member (floor or a member secured to the floor) between seats, so that the safety belt may be automatically fitted to the passenger's body by closing the door of the vehicle and the safety belt is automatically removed from the passenger's body by opening the door.

A passive safety belt device in which a safety belt extends diagonally across the passenger's body from one shoulder to the opposite hip is preferably employed in vehicles and this kind of safety belt is known as a "shoulder belt". In such a passive safety belt device, the outer end of the safety belt is connected to a sash of rear portion of the door. When providing the safety belt in a vehicle with sash-less doors, a belt supporting member is provided on a rear upper portion of the door and the end of the safety belt is connected to the supporting member. In such a device, if the belt supporting member is too high, the appearance of the interior of the vehicle is impaired, and if the member is too low, the belt presses the passenger's shoulder or neck in the fastening condition, which will cause an unpleasant feeling and impairs the fastening and releasing operation of the belt.

SUMMARY OF THE INVENTION

The present invention seeks to provide a passive safety belt device which may eliminate above described disadvantages.

According to the present invention, there is provided a safety belt device for a vehicle having sash-less doors, comprising a retractor provided in a lower portion of a central portion of the vehicle, a belt supporting member upwardly extending a predetermined height from a rear portion of said sash-less door, a safety belt connected between said retractor and said belt supporting member, and means for hardening the outer end portion of said safety belt in a predetermined range so as to maintain the end portion in an upright position comprising a spring steel plate enclosed by said safety belt at an outer end portion of the latter and secured to said belt supporting member at an end thereof, said belt supporting member being a hollow body comprising a superimposed pair of plates, bolts securing said hollow body to an inside panel of said door, and said spring steel plate and said superimposed pair of plates being secured with each other.

The present invention will be fully described with reference to the accompanying drawings.

DESCRIPTION OF THE PREFERRED EMBODIMENT

Figure 1:
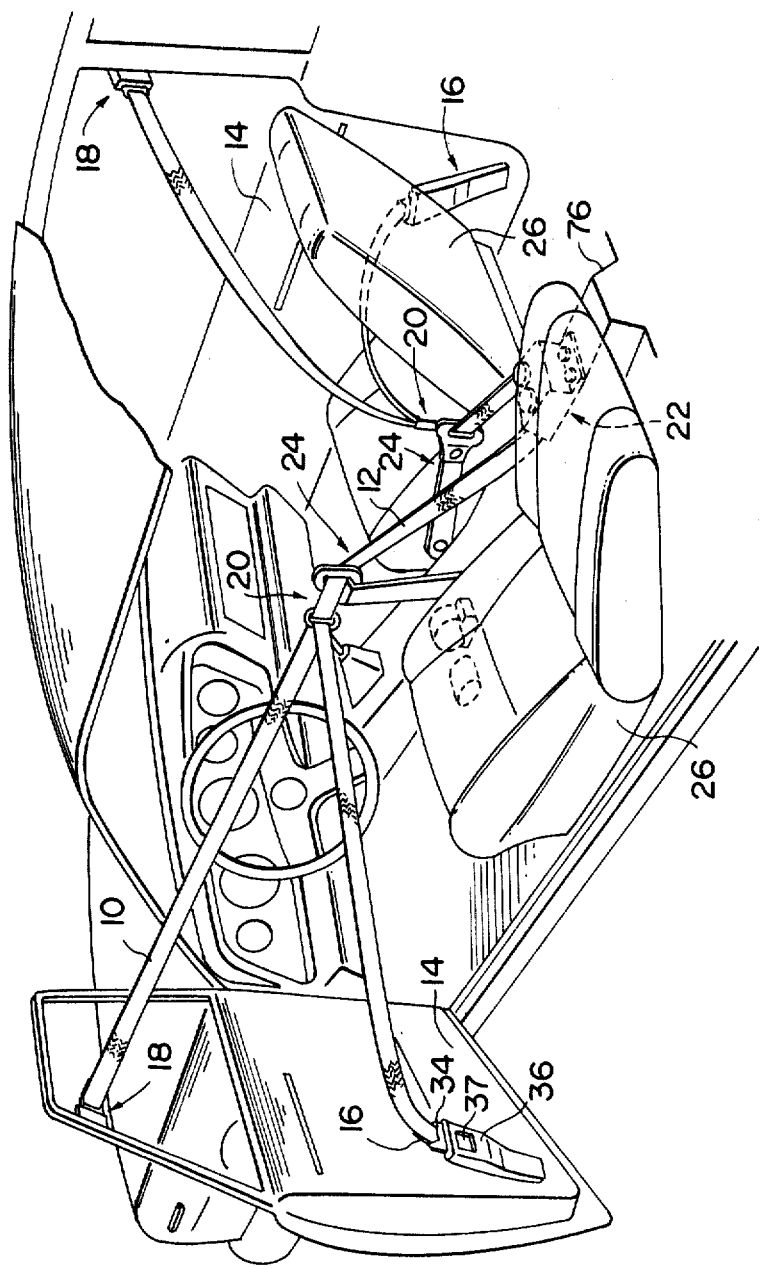
FIG. 1 is a perspective view showing an embodiment in an automobile according to the present invention.

Referring to drawings, an inner end of a safety belt 1 is connected to a retractor 2 provided on a body member, such as a floor, at a central side of a seat 7 and the outer end of the belt is connected to a hollow body belt supporting member 4 mounted on a door 3 at a rear interior portion therof.

Figure 2:
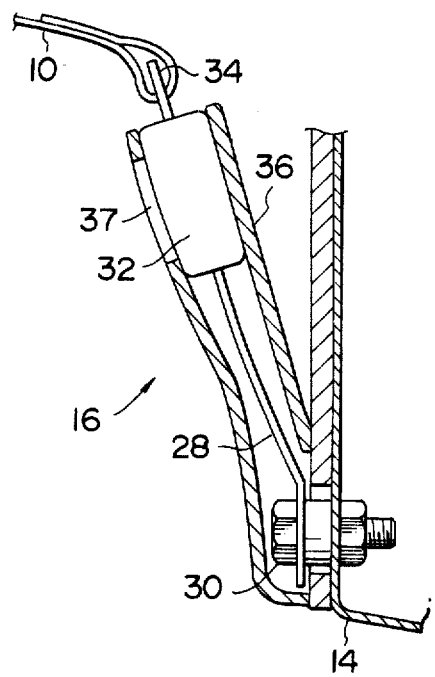
FIG. 2 is a sectional view of a belt supporting member.
Figure 4:
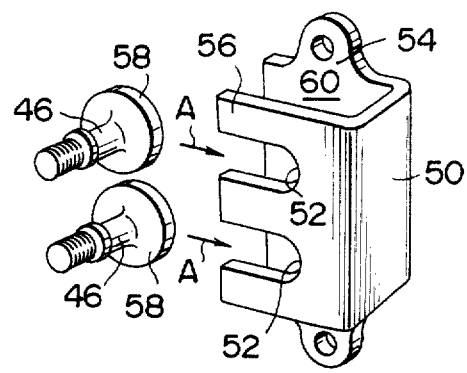
Figure 3:
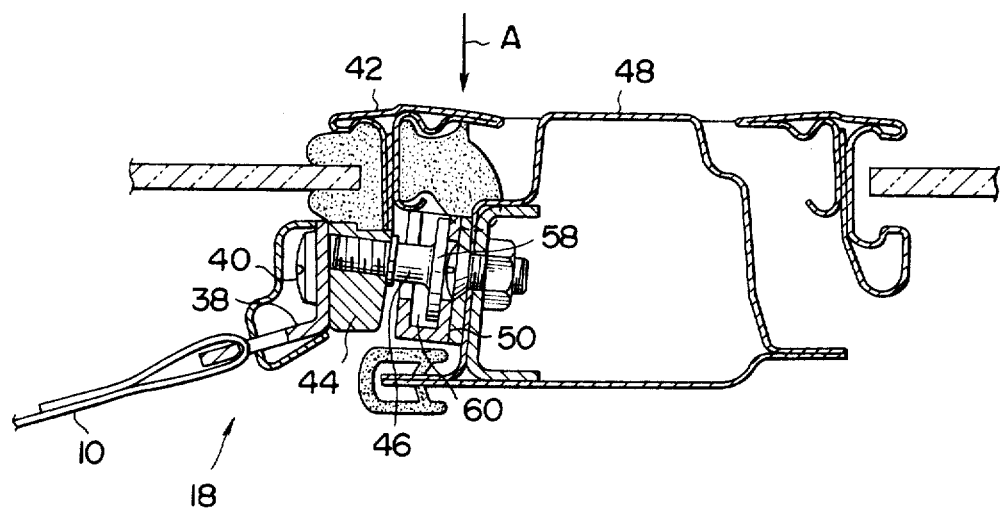
FIG. 3 is a sectional view taken along the line A—A in FIG. 2.
Figure 5:
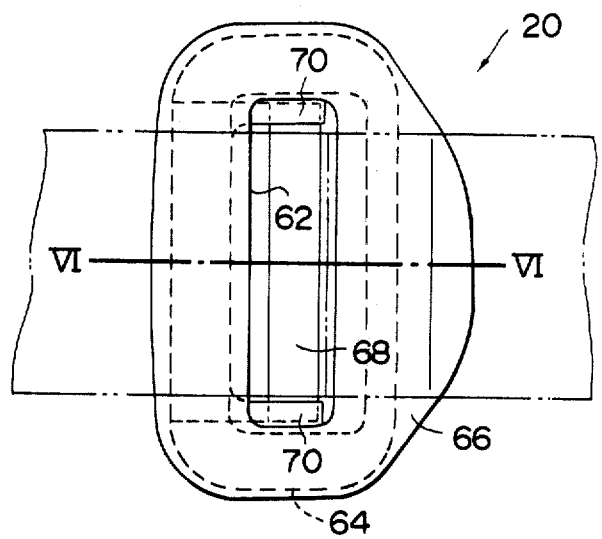
Figure 6:
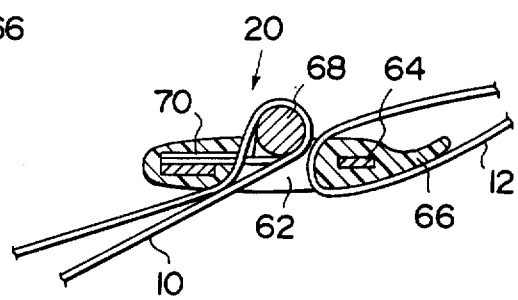
Figure 9:
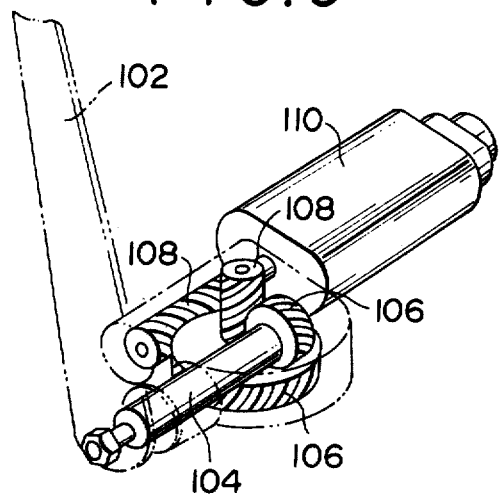
Figure 11:
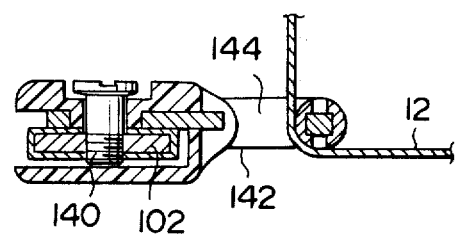
Figure 7:
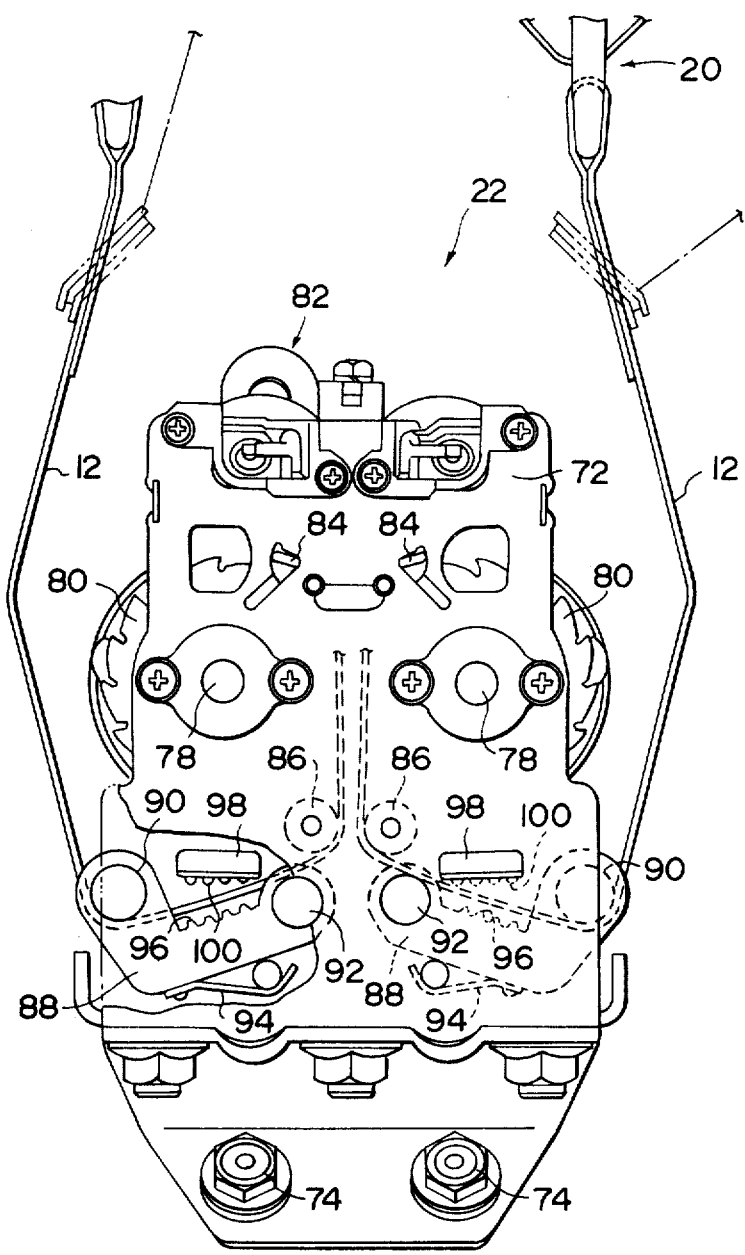
Figure 8:
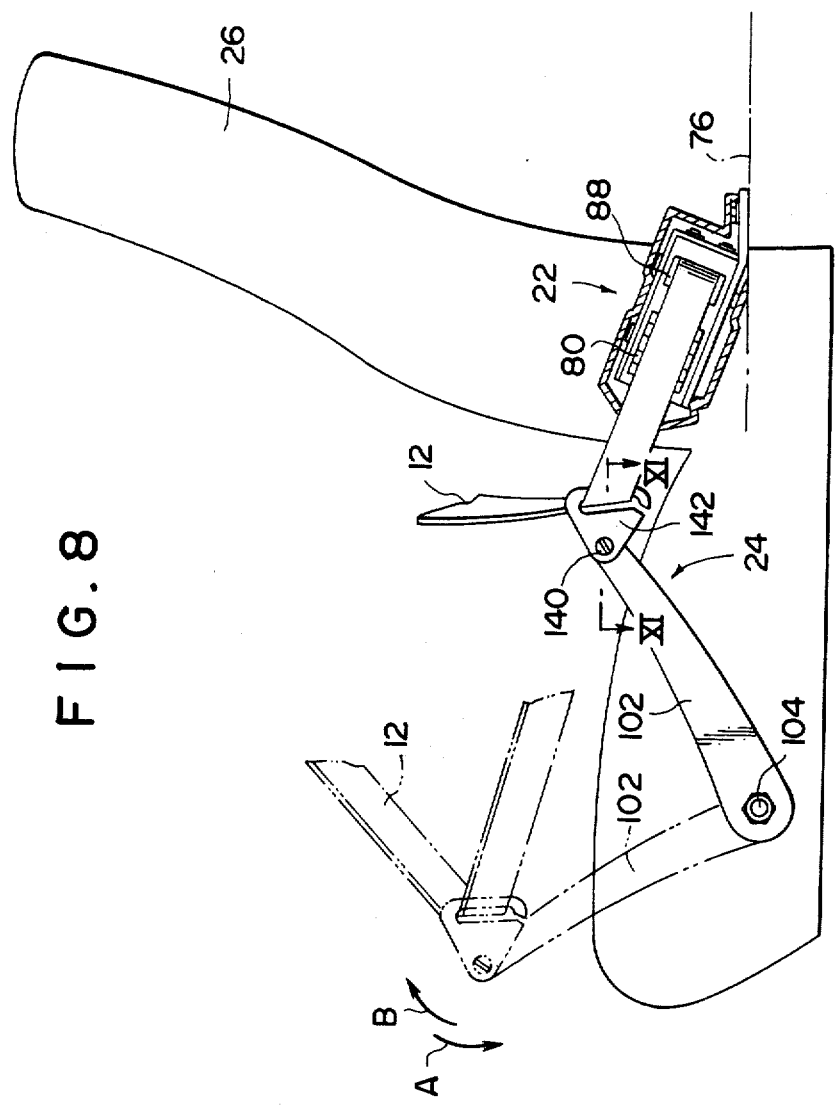
Figure 10:
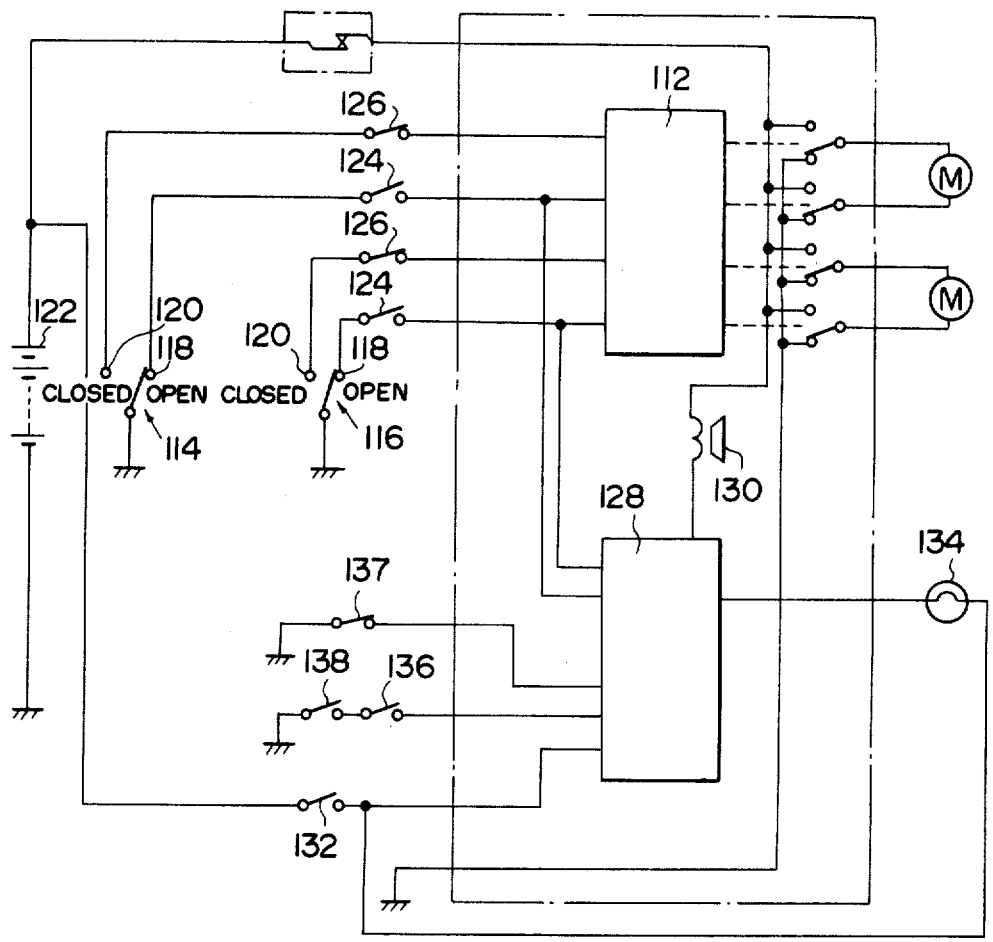

The belt supporting member 4 comprises a pair of bent plates 4c, 4d jointly secured by bolts 8, 9 to the inside panel 3c of the door 3 at a rear portion thereof so as to upwardly project a predetermined height along the inside of the window glass 3a, as shown in FIGS. 2 and 3. The attaching portion of the inside panel of the door 3 is reinforced by a bent plate reinforcement 3b spaced from the bolt 9 but connected to the bolt 8 as shown in FIG. 3. The belt supporting member 4 is covered by a cover 4a made of plastic.

The outer end portion of the safety belt 1 encloses a core member 5 such as a spring steel plate having a planar shape with a linearly elongated upper portion enclosed by an end portion of the belt to form a hardened portion 1a in a predetermined range "1" so as to maintain the end portion of the belt in an upright position against the retracting action of the retractor 2 in the normal operation. The core member 5 comprises a bottom anchor portion 5a and a bent end portion 5b. The bent end portiion 5b engages an engaging hole 4b formed in the upper flanges of the belt supporting member 4 and the anchor portion 5a is secured to the flanges of the belt supporting member 4 by a bolt 6.

In accordance with the present invention, if the belt supporting member 4 is low, the outer end portion of the belt is maintained at a predetermined height by the hardened portion 1a rigidly connected to the belt supporting member 4. Thus, the height of the belt supporting member 4 may be decreased, so that the appearance of the interior of the vehicle may be improved and yet the belt may be reliably operated depending on the opening and closing operation of the door. Since the hardened portion 1a is tilted forwardly, the safety belt does not touch the passenger's neck and the space for getting in and getting out of the vehicle may be enlarged. It will be understood that the hardened portion 1a may be formed by other means such as wire braid.

What is claimed is:

1. A passive safety belt device for a vehicle having a sash-less door, comprising
    a retractor being disposed in a lower portion of a central portion of the vehicle,
    a belt supporting member upwardly extending a predetermined height from a rear portion of the sash-less door,
    a safety belt being connected between said retractor and said belt supporting member,
    a spring steel plate enclosed by said safety belt at an outer end portion of the latter and secured to said belt supporting member at an end thereof,
    said belt supporting member being a hollow body comprising a superimposed pair of plates,
    bolts rigidly securing said hollow body to an inside panel of said door at said rear portion, and
    said spring steel plate and said superimposed pair of plates being secured to each other.

2. The passive safety belt device having a sash-less door as set forth in claim 1, further comprising
    a formed sheet reinforcement connected to said pair of plates by said bolts with said inside panel of said door positioned between one of the plates of said pair of plates and said reinforcement.

3. The passive safety belt device having a sash-less door as set forth in claim 1, wherein
   each of said plates of said pair of plates forms a flange, respectively, engaging one another at an upper portion of said pair of plates,
   bolt means for connecting said spring steel plate to said flanges,
   said flanges constitute said end of said belt supporting member.

4. The passive safety belt device having a sash-less door as set forth in claim 3, wherein
   said flanges are formed with an engaging hole,
   said spring steel plate is formed with a bottom anchor portion connected to said flanges by said bolt means,
   a bottom portion of said anchor portion forms a bent end portion engaging in said engaging hole in said flanges.

5. The passive safety belt device having a sash-less door as set forth in claim 4, wherein
   said bottom anchor portion of said spring steel plate is formed with a slot at an upper portion thereof through which said outer end portion of said safety belt extends and is folded over so as to enclose an upper portion of said spring steel plate.

6. The passive safety belt device having a sash-less door as set forth in claim 1, wherein
   said pair of plates comprises a first plate having a lower portion having a contour substantially complementary to and engaging therealong an upper inner surface of said inside panel of the door and having an upper portion extending above said upper inner surface of said inside panel and parallel to a window glass extending upwardly from said inside panel of the door,
   both of said plates of said pair of plates has flanges abutting one another and said plates extend away from each other from said flanges and form said hollow body, one of said bolts being connected to said inside panel and to said flanges at a lower portion of said pair of plates,
   a central height portion of the other plate of said pair of plates forms a recess through which another of said bolts extends, said another bolt further extends through said first plate of said pair of plates spaced from said other plate and through said inside panel.

7. The passive safety belt device having a sash-less door as set forth in claim 6, further comprising
   a plate comprising a reinforcement extending on an outer surface of said inside panel of said door engaging substantially complementarily thereto at a lower portion of said reinforcement and is connected thereto by said one of said bolts and said reinforcement has an upper portion bent outwardly spaced away from said outer surface of said inside panel adjacent and spaced from said another of said bolts.

8. The passive safety belt device for a vehicle having a sash-less door as set forth in claim 1, wherein
   said spring steel plate and said outer end portion of said safety belt are tilted in a forward direction of said vehicle.

9. The passive safety belt device having a sash-less door as set forth in claim 1, wherein
   said spring steel plate is planar and extends linearly in a length-wise direction.

* * * * *